Dec. 4, 1951 A. H. DICKINSON 2,577,075

BINARY-DECADE COUNTER

Filed Jan. 21, 1949 6 Sheets-Sheet 1

INVENTOR
ARTHUR H. DICKINSON
BY Dwight D. Mooney
AGENT

FIG. 1a

| INPUT PULSES | TRIGGERS | | | | TUBES | | |
|---|---|---|---|---|---|---|---|
| | A | B | C | D | 10 | 11 | 12 |
| 0 | 0 | 0 | 0 | 0 | X | 0 | 0 |
| 1 | X | 0 | 0 | 0 | X | 0 | 0 |
| 2 | 0 | X | 0 | 0 | X | 0 | 0 |
| 3 | X | X | 0 | 0 | X | 0 | 0 |
| 4 | 0 | 0 | X | 0 | 0 | X | X |
| | X | X | | | X | 0 | 0 |
| 5 | 0 | 0 | 0 | X | X | 0 | 0 |
| 6 | X | 0 | 0 | X | X | 0 | 0 |
| 7 | 0 | X | 0 | X | X | 0 | 0 |
| 8 | X | X | 0 | X | X | 0 | 0 |
| 9 | 0 | 0 | X | X | 0 | X | X |
| | X | X | | | X | 0 | 0 |
| 10 | 0 | 0 | 0 | 0 | X | 0 | 0 |

| INPUT PULSES | TRIGGERS | | | | TUBES | | |
|---|---|---|---|---|---|---|---|
| | A | B | C | D | 10 | 11 | 12 |
| 0 | X | X | 0 | 0 | X | 0 | 0 |
| 1 | 0 | 0 | X | 0 | X | 0 | 0 |
| 2 | X | 0 | X | 0 | X | 0 | 0 |
| 3 | 0 | X | X | 0 | X | 0 | 0 |
| 4 | X | X | X | 0 | X | 0 | 0 |
| 5 | 0 | 0 | 0 | X | 0 | X | X |
| | X | X | | | X | 0 | 0 |
| 6 | 0 | 0 | X | X | X | 0 | 0 |
| 7 | X | 0 | X | X | X | 0 | 0 |
| 8 | 0 | X | X | X | X | 0 | 0 |
| 9 | X | X | X | X | X | 0 | 0 |
| 10 | 0 | 0 | 0 | 0 | 0 | X | X |
| | X | X | | | X | 0 | 0 |

FIG. 2a

INVENTOR
ARTHUR H. DICKINSON
BY Dwight D. Mooney
AGENT

Dec. 4, 1951 A. H. DICKINSON 2,577,075

BINARY-DECADE COUNTER

Filed Jan. 21, 1949 6 Sheets-Sheet 3

INVENTOR
ARTHUR H. DICKINSON
BY Dwight D. Mooney
AGENT

Dec. 4, 1951 A. H. DICKINSON 2,577,075

BINARY-DECADE COUNTER

Filed Jan. 21, 1949 6 Sheets-Sheet 4

INVENTOR
ARTHUR H. DICKINSON
BY Dwight D. Mooney
AGENT

FIG-3a-

| INPUT PULSES | TRIGGERS | | | | TUBES | | |
|---|---|---|---|---|---|---|---|
| | A | B | C | D | 10 | 11 | 12 |
| 0 | 0 | 0 | 0 | 0 | X | 0 | 0 |
| 1 | X | 0 | 0 | 0 | X | 0 | 0 |
| 2 | 0 | X | 0 | 0 | X | 0 | 0 |
| 3 | X | X | 0 | 0 | X | 0 | 0 |
| 4 | 0 | 0 | X | 0 | X | 0 | 0 |
| 5 | X | 0 | X | 0 | X | 0 | 0 |
| 6 | 0 | X | X | 0 | X | 0 | 0 |
| 7 | X | X | X | 0 | X | 0 | 0 |
| 8 | 0 | 0 | 0 | X | 0 | X | X |
| | | X | X | | X | 0 | 0 |
| 9 | X | X | X | X | X | 0 | 0 |
| 10 | 0 | 0 | 0 | 0 | X | 0 | 0 |

| INPUT PULSES | TRIGGERS | | | | TUBES | | |
|---|---|---|---|---|---|---|---|
| | A | B | C | D | 10 | 11 | 12 |
| 0 | 0 | X | X | 0 | X | 0 | 0 |
| 1 | X | X | X | 0 | X | 0 | 0 |
| 2 | 0 | 0 | 0 | 0 | X | 0 | 0 |
| 3 | X | 0 | 0 | X | X | 0 | 0 |
| 4 | 0 | X | 0 | X | X | 0 | 0 |
| 5 | X | X | 0 | X | X | 0 | 0 |
| 6 | 0 | 0 | X | X | X | 0 | 0 |
| 7 | X | 0 | X | X | X | 0 | 0 |
| 8 | 0 | X | X | X | X | 0 | 0 |
| 9 | X | X | X | X | X | 0 | 0 |
| 10 | 0 | 0 | 0 | 0 | 0 | X | X |
| | | X | X | | X | 0 | 0 |

FIG-4a-

INVENTOR
ARTHUR H. DICKINSON
BY Dwight D. Mooney
AGENT

INVENTOR
ARTHUR H. DICKINSON
BY Dwight D. Mooney
AGENT

Patented Dec. 4, 1951 2,577,075

UNITED STATES PATENT OFFICE 2,577,075

BINARY-DECADE COUNTER

Arthur H. Dickinson, Greenwich, Conn., assignor to International Business Machines Corporation, New York, N. Y., a corporation of New York Application January 21, 1949, Serial No. 71,796

5 Claims. (Cl. 250—27)

Figure 1:
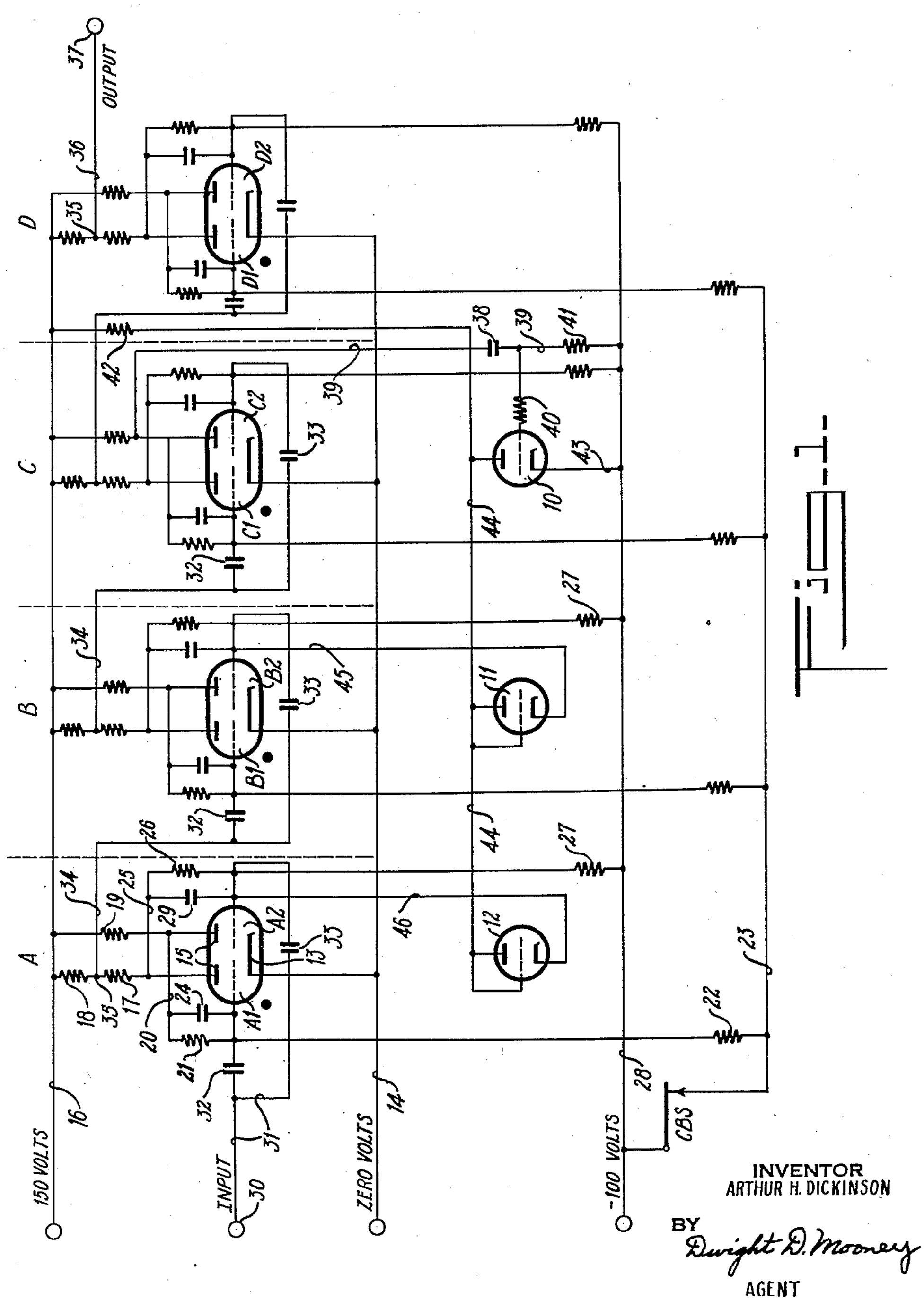

This invention relates to electronic counters and more particularly to a decade counter comprising a series chain of trigger circuits each having two stable conditions.

In such counters various arrangements of feedback pulses and tube blocking have been employed to convert from the binary system of counting to the decade system of counting. Such arrangements are inherently disadvantageous in that critical voltage adjustments are required to prevent or suppress the ordinary switching of certain triggers from one stable condition to the other.

Accordingly, it is a principal object of this invention to provide a decade counter from a series chain of triggers wherein the above disadvantages are eliminated.

Another object is to provide a novel circuit arrangement for converting a binary counter into a decade counter wherein the conversion circuit is inoperative except when actually effecting the conversion to decade operation.

Another object is to provide means for converting a binary counter to a decade counter wherein tubes are energized cyclically by the counter to effect a switching of the stable condition of a plurality of triggers and no priming or conditioning of said tubes is required.

A further object is to provide a novel circuit arrangement for converting a binary counter to a decade counter wherein the counter itself energizes a circuit which effects the conversion by applying a voltage pulse, independent of the voltage relationships of said counter, to the control grids of preselected tubes of the counter.

A still further object is to provide means for converting a binary counter to a decade counter wherein said means is independent of the voltage relationships of the counter and cyclically initiated by the counter operation.

Other objects of the invention will be pointed out in the following description and claims and illustrated in the accompanying drawings, which disclose, by way of example, the principle of the invention and the best mode, which has been contemplated, of applying that principle.

Figure 2:
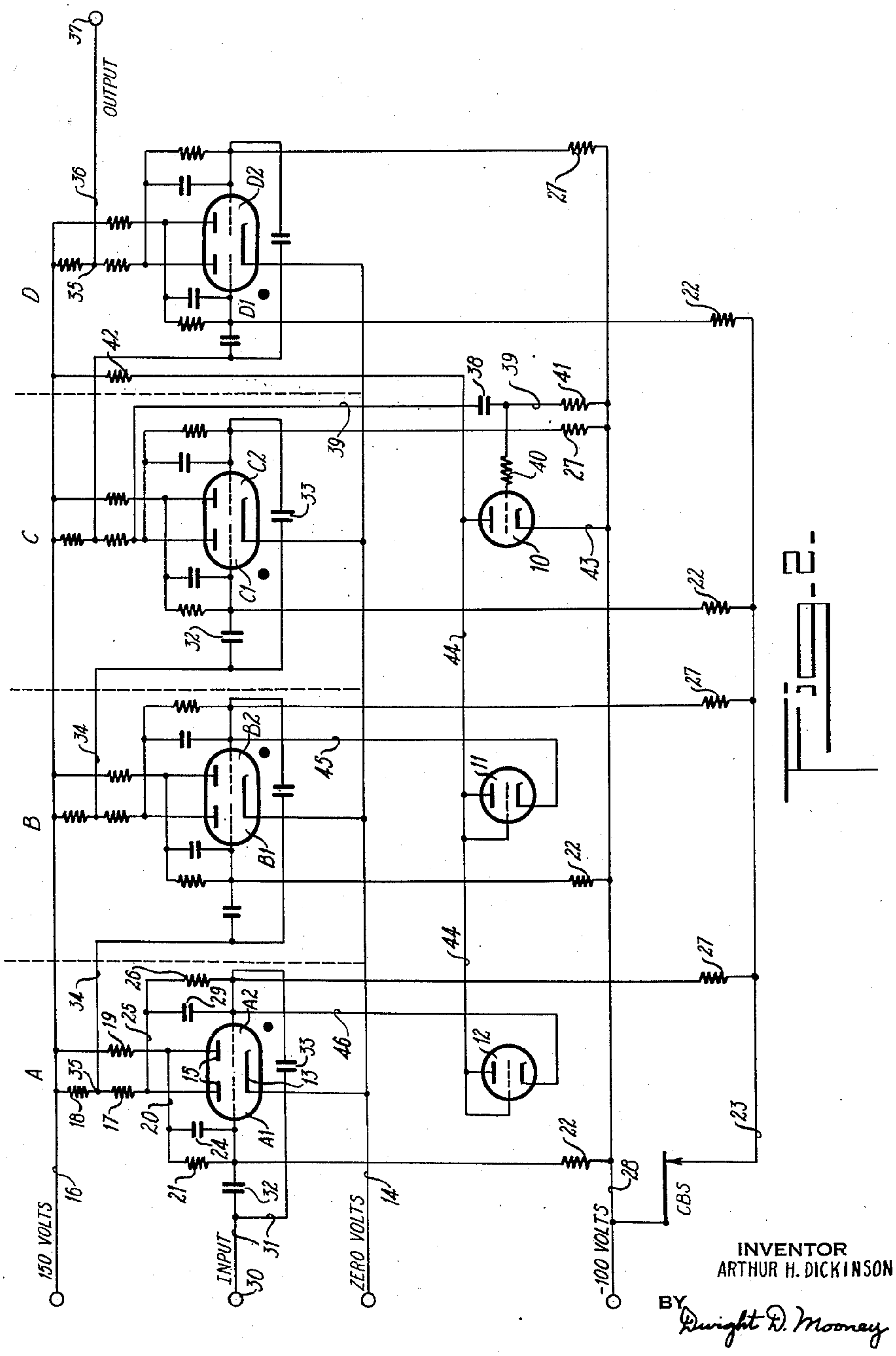

In the drawings:

Fig. 1 is a circuit diagram of an electronic counting circuit illustrating one embodiment of the invention;

Fig. 1*a* is a chart showing the stable condition of the component parts of the embodiment shown in Fig. 1 during a cycle of operation;

Fig. 2 is a circuit diagram of another embodiment of the invention;

Fig. 2*a* is a chart showing the stable condition of the component parts of the embodiment shown in Fig. 2 during a cycle of operation.

Figure 3:
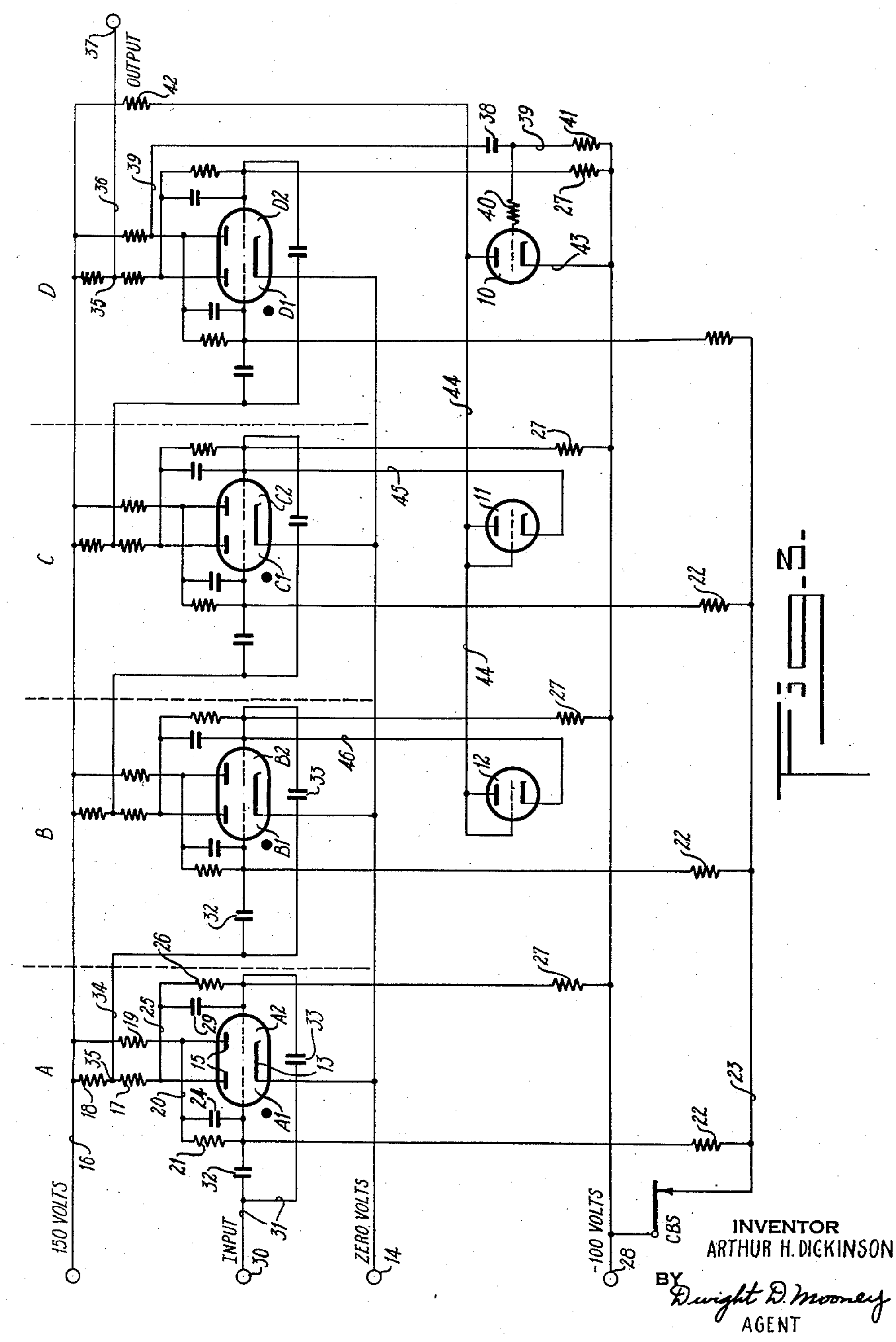
Figure 4:
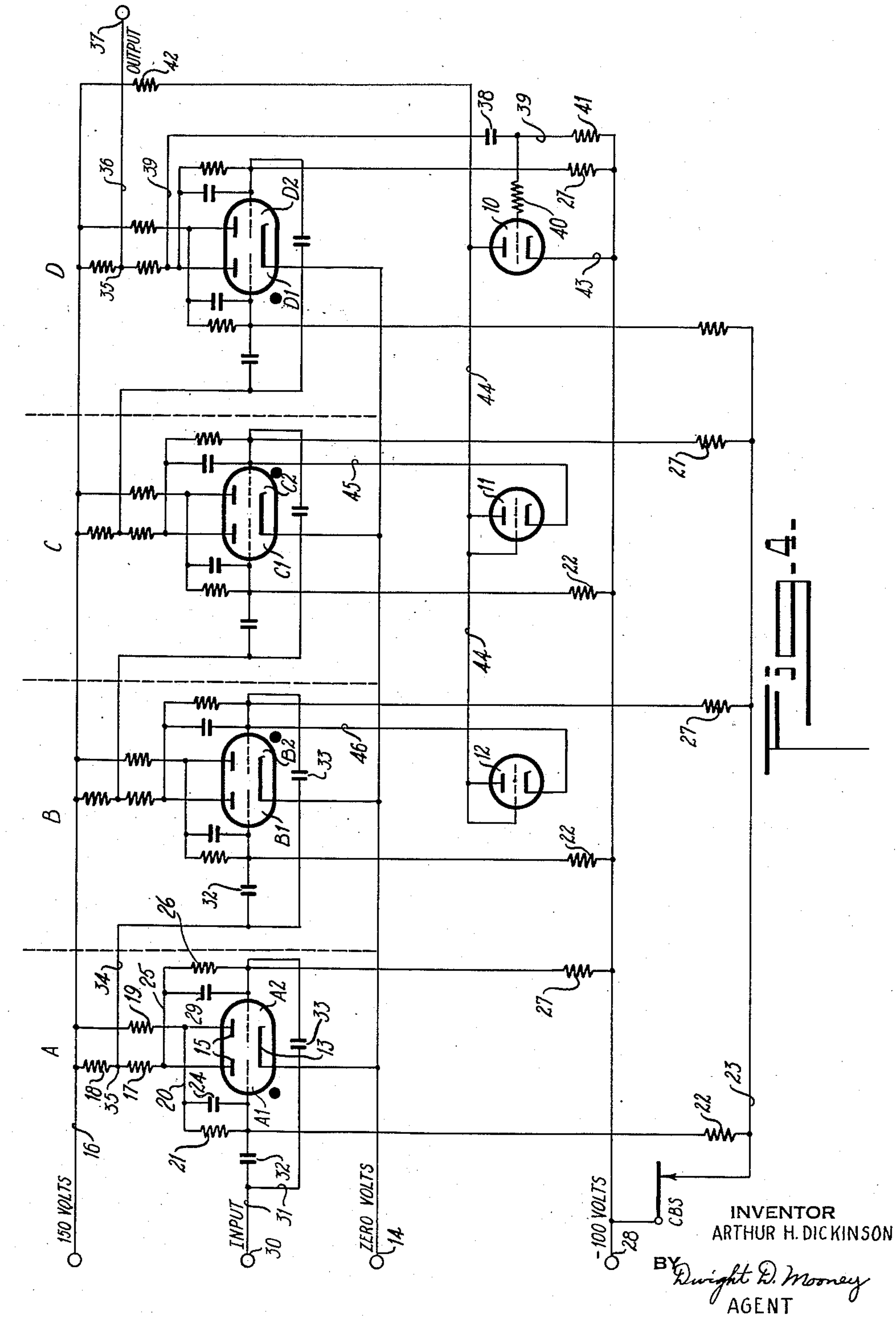

Fig. 3 is a circuit diagram of another embodiment of the invention;

Fig. 3*a* is a chart showing the stable condition of the component parts of the embodiment shown in Fig. 3 during a cycle of operation;

Fig. 4 is a circuit diagram of a further embodiment of the invention; and,

Fig. 4*a* is a chart showing the stable condition of the component parts of the embodiment shown in Fig. 4 during a cycle of operation.

Referring to the drawings and more particularly to Fig. 1, this embodiment of the novel counter comprises four trigger circuits A, B, C and D connected in cascade and shown for simplicity of illustration in the drawing as divided by broken vertical lines. Tubes 10, 11 and 12 and their associated circuits are provided as means for effecting a change in the stable condition of the counter. Each of the triggers A, B, C and D includes two grid controlled tubes designated A1 and A2, B1 and B2, C1 and C2, and D1 and D2, respectively. The tubes used are all of the same type and may, for example, be of the type having two tubes in a single envelope such as the 12SN7 type tube, or if desired all tubes may be of the type having a single tube in an envelope.

Each trigger circuit A to D has two stable conditions which are assumed alternately, in one of which one tube is conductive and the other tube non-conductive and in the other condition the tubes have the reverse conductive conditions. These conditions are referred to herein as "on" and "off."

The "off" condition is assumed when the left-hand tube (A1, for example, of the trigger A) is conductive and the right-hand tube (A2) is non-conductive. The "on" condition is assumed when the right-hand tube is conductive and the left-hand tube is non-conductive.

In the initial or zero starting position of the counter of Fig. 1 each of the triggers A to D is in the "off" condition. The switching of any subsequent trigger from either condition to the other occurs when a negative pulse is applied simultaneously to the control grids of its tubes. Such negative pulses may be applied from an outside source or from a trigger prior to it in the series chain. The trigger circuits are arranged so that the tubes of the triggers are non-responsive to positive pulses of equal amplitude to that of the negative pulses when the positive pulses are applied to the triggers as the negative pulses are applied. However, the triggers are responsive to positive pulses from the tubes 11 and 12 when those pulses are applied directly to the control grid of one tube of the trigger.

The arrangement and normal operation of the trigger circuit A will be described with reference to the values of applied voltage and the values of resistances and capacitances employed therein. These and other values are given hereinafter solely for the purpose of clarifying the explanation and it is to be specifically understood that they may be varied considerably without departing from the principles of the invention. The actual values are determined, among other things, by the upper and lower speeds of the entries to be counted.

The cathode 13 of tubes A1 and A2 is connected to a zero volt line 14 and plates 15 are connected to a +150 volt line 16, the plate of A1 being connected thereto through resistors 17 and 18 in series and the plate of A2 through a resistor 19, the combined value of the resistors 17 and 18 being equal to that of the resistor 19. Resistors 17, 18 and 19 are of 10,000 ohms, 10,000 ohms and 20,000 ohms, respectively. A lead 20 connects the plate of the tube A2 to the upper end of a voltage divider consisting of resistors 21 and 22, each of 200,000 ohms. The lower end of the divider is connected to a −100 volt cancel bias line 23. A capacitor 24 of 0.0001 microfarads shunts the resistor 21.

Similarly a lead 25 connects the plate of the tube A1 to the upper end of a voltage divider consisting of resistors 26 and 27, each of 200,000 ohms. The lower end of the divider is connected to a −100 volt bias line 28. As shown the cancel bias line 23 has a potential of −100 volts on it only when a cancel bias switch, CBS, joining the lines 23 and 28 is closed. A capacitor 29 of 0.0001 microfarads shunts the resistor 26.

Input terminal 30 is connected to a suitable source (not shown) of entries to be counted. These entries may comprise a series of negative pulses having characteristics suitable to effect a switching of the trigger circuit A. These negative pulses are applied via a lead 31 to the control grids of the tubes A1 and A2 through capacitors 32 and 33, respectively, each of 0.0001 microfarads. A trigger output lead 34 is connected at one end to a point 35 intermediate the load resistors 17 and 18 and at its other end to the input coupling capacitors 32 and 33 connected to the control grids of the tubes B1 and B2, respectively. The transfer of negative pulses from the trigger A over the lead 34 controls trigger B, i. e. determines whether B is in the "off" or "on" condition.

Since trigger A is in the "off" condition at the zero or starting position, the tube A2 is biased to cutoff by the well-known action resulting from the conduction of the tube A1. As stated the triggers B, C and D are also in the "off" condition at the zero or starting time. The control grids of the tubes A1, B1, C1 and D1 are connected to the cancel bias line 23, which provides for quick resetting to the preselected zero or starting condition given above.

To reset the circuit to the preselected starting condition the cancel bias line 23 is disconnected from its −100 volt supply, for example, by the opening of the switch CBS. When the switch CBS is opened the grid bias voltage applied to the tubes A1, B1, C1 and D1 rises above the cutoff value and these tubes are rendered conductive irrespective of their condition immediately prior to the time when the switch CBS was opened.

A similar cancel bias system is provided for each embodiment of the invention and in each case the purpose served is the same, the particular changes being in the connections between the particular control grids of the chosen tubes and the cancel bias line, to determine different preselected starting conditions of the respective trigger circuits.

It should be observed that the tubes having their control grids connected to the cancel bias line 23 are conductive when the counter is in the zero or preselected starting position. The re-closing of the switch CBS does not remove the positive bias on the selected tubes but permits them to remain conductive until an entry changes the stable condition of the trigger. For example when switch CBS is re-closed the control grid of the tube A1 is placed at a potential determined by the voltage divider comprising resistors 19, 21 and 22 connected between the lines 16 and 23 and is greater than the voltage required to render the tube A1 conductive.

When the first negative pulse is applied to the control grids of the tubes A1 and A2 it has no direct effect on A2 since its control grid is already biased below cutoff. But, the first negative pulse causes the control grid of A1 to be biased below cutoff and the tube A1 is thereupon rendered non-conductive. The plate voltage of the tube A1 then rises toward that of the line 16. The increased voltage at the plate of the tube A1 is transferred from its plate to the control grid of the tube A2 through the parallel connected resistor 26 and capacitor 29. As a result, the control grid of the tube A2 is made sufficiently positive to render the tube A2 conductive. Because of this conduction the voltage at the plate of the tube A2 decreases. The decreased voltage is transferred to the control grid of the tube A1 through the parallel connected resistor 21 and capacitor 24 and maintains the tube A1 non-conductive. The tube A1 remains non-conductive and the tube A2 conductive until the next negative pulse is applied to the control grids of the trigger A. It is now obvious that the first negative pulse switches trigger A, as a whole, from the "off" condition to the "on" condition, the "off" condition, as set forth above, having been assumed as tube A1 conductive and tube A2 non-conductive.

In a similar manner, the arrival of the second negative pulse renders the tube A2 non-conductive and the resulting rise in its plate voltage is transferred to the control grid of the tube A1 to permit that tube to become conductive and thereby hold the tube A2 in a non-conductive state, also the decrease in the plate voltage of the tube A1 caused by its conduction is transferred to the control grid of the tube A2. It is to be particularly noted that this decrease in the plate voltage of the tube A1 is also transferred to the control grids of the tubes B1 and B2 via the output lead 34. This decrease, as explained for the trigger A, impressed simultaneously on the control grid of the conducting tube B1 and on the control grid of the non-conducting tube B2 causes the tube B1 to become non-conductive and the tube B2 to become conductive thereby placing the trigger circuit B in the "on" condition.

Now, that the cycle of trigger operation is understood, a description of the construction and operation of the novel counter will be undertaken.

The output of the trigger B is applied to the control grids of the trigger C and the output of the trigger C is applied to the control grids of the trigger D, in each instance the connection between triggers is identical with that between the triggers A and B. The output lead 36 from the trigger D is connected to an output terminal 37, the output of the counter appearing between the terminal 37 and the zero volt line 14.

The plate of the tube C2 is connected to the control grid of the tube 10 through a capacitor 38 of 0.00001 microfarads, a lead 39 and a resistor 40 of 500,000 ohms. Also, the control grid of the tube 10 is connected through a resistor 41 of 250,000 ohms to the −100 volt line 28. The plate of the tube 10 is connected to the +150 volt line 16 through a resistor 42 of 50,000 ohms and the cathode is connected to the —100 volt line 28 through a lead 43.

The tubes 11 and 12 each have their control grid connected to their plate and are therefore operated as diodes. The plates of the tubes 11 and 12 are connected to the plate of the tube 10 through a lead 44. The cathode of the tube 11 is connected to the control grid of the tube B2 through a lead 45 and the cathode of the tube 12 is connected to the control grid of the tube A2 through a lead 46.

The tube 10 is normally conductive and its plate voltage is low, this voltage is transferred to the plates of the tubes 11 and 12 over the lead 49 and is insufficient to allow them to conduct. This is so because the voltage applied to the plates of the tubes 11 and 12 which is the voltage present at the plate of the tube 10 is less than the voltage drop across the resistors 27 connected to the control grids of the tubes A2 and B2.

The description of one complete cycle of counter operation will be undertaken jointly in connection with the circuit diagram of Fig. 1 and the chart of Fig. 1*a* wherein "X" indicates conduction of the tubes 10, 11 and 12 and the "on" condition of the triggers A, B, C and D and "0" indicates non-conduction of the tubes 10, 11 and 12 and the "off" condition of the triggers A, B, C and D. These designations are employed throughout the specification.

As used herein a dot at the lower left side or the lower right side of a tube indicates that the adjacent tube section is conductive when the counter is in the zero or starting condition.

Fig. 1*a* illustrates that all triggers are in the "on" condition, the tube 10 conductive and the tubes 11 and 12 non-conductive when the counter is in the zero or starting condition.

As explained previously, the first input pulse causes the trigger A to switch "on" and the second input pulse causes the trigger A to switch "off," this second switching of the trigger A causes the trigger B to switch "on."

The third pulse applied to the input terminal 30 causes the trigger A to switch "on." This switching of the trigger A has no effect on the stable condition of the trigger B since it is a positive pulse that is transferred from the plate of the non-conducting tube A1 over the lead 34 and the capacitors 32 and 33 to the control grids of the tubes B1 and B2.

The fourth pulse applied to the input terminal 30 causes the trigger A to switch "off." As a result a negative pulse is transferred over the lead 34 to the control grids of the tubes B1 and B2 thereby causing the trigger B to switch "off." When the trigger B switches "off", a negative pulse is transferred from the plate circuit of the conducting tube B1 over the lead 34 and the capacitor 32 and 33, respectively, to the control grids of the tubes C1 and C2 to switch the trigger C to the "on" condition.

When the trigger C switches "on," a negative pulse of sufficient value to render the tube 10 non-conductive is developed across the resistor 41. This pulse is thus applied to the control grid of the tube 10 and renders it non-conductive for the duration of the pulse. The resulting increased voltage at the plate of the tube 10 is transferred to the plates of the tubes 11 and 12 through the lead 44. The tubes 11 and 12 are thus rendered conductive and current flows from the +150 volt line 16 through the resistor 42, a lead 47, the lead 44, the tubes 11 and 12 and the leads 45 and 46, respectively, and the resistors 27 connected to the control grids of the tubes A2 and B2 to the —100 volt line 28.

The increased voltage drop across the resistors 27 caused by the current flow renders the control grids of the non-conductive tubes A2 and B2 sufficiently positive to initiate the switching of the triggers. As a result the triggers A and B are switched from the "off" to the "on" condition. The switching of the triggers A and B is equivalent to applying three pulses to be counted to the input terminal 30.

When the effect of the pulse rendering the tube 10 non-conductive is ended, that tube returns to the conductive state. The decreased voltage at its plate is transferred to the plates of the tubes 11 and 12 to render them non-conductive.

The fifth pulse applied to the input terminal 30 causes the trigger A to switch to the "off" condition. When the trigger A switches "off," a negative pulse is transferred through the lead 34 and capacitors 32 and 33, respectively, to the control grids of the tubes B1 and B2 to switch the trigger B "off." In a like manner, a negative pulse is transferred from the plate circuit of the tube B1 to the control grids of the tubes C1 and C2 to switch the trigger C "off." The switching of the trigger C causes a negative pulse to be transferred to the control grids of the trigger D and thereby switch it "on." When trigger D switches "on," a positive pulse is transferred over the lead 36 to the output terminal 37.

The sixth pulse applied to the input terminal 30 causes the trigger A to switch from the "off" to the "on" condition. As a result a positive pulse is transferred from the plate circuit of the tube A1 through the lead 34 and capacitors 32 and 33, respectively, to the control grids of the tubes B1 and B2 and, for the reasons explained hereinbefore, has no effect on the stable condition of the trigger B.

The seventh pulse applied to the input terminal 30 causes the trigger A to switch from the "on" to the "off" condition. A negative pulse is transferred to the control grids of the tubes B1 and B2 and switches the trigger B from the "off" to the "on" condition. As a result, a positive pulse is transferred to the control grids of the tubes C1 and C2 and is ineffective to switch the stable condition of the trigger C.

The eighth negative pulse applied to the input terminal 30 switches the trigger A from the "off" to the "on" condition.

The ninth negative pulse applied to the input terminal 30 switches the trigger A "off." The resulting negative pulse in the plate circuit of the tube A1 is transferred to the control grids of the tubes B1 and B2 and switches the trigger B "off." When the trigger B switches "off," the negative pulse in the plate circuit of the tube B1 is transferred to the control grids of the tubes C1 and C2 and switches the trigger C "on."

When the trigger C switches "on," a decreased voltage appears at the plate of the conductive tube C2. Again, this decreased voltage is transferred to the control grid of the tube 10 and renders that tube non-conductive. As explained hereinbefore, this non-conduction of the tube 10 renders the tubes 11 and 12 conductive and effects a switching of the triggers A and B to the "on" condition. When the effect of the pulse from the plate circuit of the tube C2 has ended the tube 10 again becomes conductive and the tubes 11 and 12 non-conductive.

This switching of the triggers A and B, as that following the fourth pulse to be counted, effectively advances the operational cycle of the counter by a count of three. Hence, before the tenth pulse to be counted has been received the operational cycle of the counter has been advanced by a count of six. This adding of counts by the switching of triggers in response to the tubes 11 and 12 is referred to hereinafter as the production of or addition of artificial counts in the counter. It can thus be seen that each trigger circuit is employed as a counting element.

The tenth pulse applied to the input terminal 30 switches trigger A from the "on" to the "off" condition. This switching of trigger A causes a negative pulse to be transferred from the plate circuit of the tube A to the control grids of the tubes B1 and B2 to switch the trigger B from the "on" to the "off" condition. In a like manner, the switching of trigger B causes a negative pulse to be transferred to the control grids of the tubes C1 and C2 to switch the trigger C from the "on" to the "off" condition and the switching of the trigger C causes a negative pulse to be transferred to the control grids of the tubes D1 and D2 to switch the trigger D from the "on" to the "off" condition. When the trigger D switches "off," a negative pulse is transferred from the plate circuit of the conducting tube D1 to the output terminal 37.

The counter is now in the zero or starting condition and the application of pulses to the input terminal 30 causes the above described cycle of operation to be repeated and a negative pulse to appear at the terminal 37 in response to each tenth pulse applied to the terminal 30.

Referring to Fig. 2, this embodiment of the counter comprises exactly the same circuit as shown in Fig. 1 except for the voltage bias connections to the control grids of the tubes of the triggers A, B, C, and D. The control grids of the tubes A1 and B1 are each connected through a bias resistor 22 to the −100 volts line 28 and the control grids of the tubes C2 and D2 are each connected through a bias resistor 27 to the line 28. The control grids of the tubes A2 and B2 are each connected through a bias resistor 27 to the cancel bias line 23 and the control grids of the tubes C1 and D1 are each connected through a bias resistor 22 to the line 23. Also the lead 39 is connected between the plate of the tube C1 and the control grid of the tube 10 so that tube 10 will be cyclically controlled by the voltage at the plate of the tube C1 instead of that at the plate of the tube C2 as in Fig. 1. From these connections and the description relative to Fig. 1, it is readily seen that the triggers A and B are in the "on" condition and the triggers C and D are in the "off" condition in the starting or zero condition of the counter.

Description of the operation of the counter during one cycle of operation will be undertaken, in connection with Figs. 2 and 2*a* jointly.

When the counter is in the zero or starting condittion, ready to receive the first input pulse, the triggers A and B are "on," the triggers C and D are "off," the tube 10 conductive and the tubes 11 and 12 non-conductive.

The first negative pulse applied to the input terminal 30 switches the trigger A "off." This switching of the trigger A causes the trigger B to switch "off" and the switching of the trigger B causes the trigger C to switch "on." This normal binary operation is continued through receipt of the fourth pulse as is indicated in Fig. 2*a*, when triggers A, B and C are "on" and trigger D is "off."

The fifth negative pulse applied to the input terminal 30 switches the trigger A "off." The switching of the trigger A causes the trigger B to switch "off" and the switching of the trigger B causes the trigger C to switch "off." The switching of the trigger C causes the trigger D to switch "on." When the trigger D switches "on," a positive pulse is transferred through the lead 36 to the output terminal 37. The switching of the trigger C causes, also, a negative pulse to be transferred to the control grid of the conducting tube 10 and renders it non-conductive. As described in connection with Fig. 1, the tubes 11 and 12 are rendered conductive and switch the triggers A and B to the "on" condition. When the effect of the negative pulse on the control grid of the tube 10 has ended, it again becomes conductive and the tubes 11 and 12 become non-conductive.

The six through the ninth pulses to be counted cause normal binary operation of the counter as indicated in Fig. 2*a*. After the ninth pulse, triggers A, B, C and D are all "on."

The tenth pulse applied to the input terminal 30 switches the trigger A "off" and the switching of the trigger A causes the trigger B to switch "off." The switching of the trigger B causes the trigger C to switch "off." The switching of the trigger C causes the trigger D to switch "off" and a negative pulse to be transferred over the lead 36 to the output terminal 37. The switching of the trigger C causes, also, a negative pulse to be transferred to the control grid of the conductive tube 10 to render it non-conductive. The tubes 11 and 12 are then rendered conductive to switch the triggers A and B "on." The tube 10 then becomes conductive and the tubes 11 and 12 non-conductive and the trigger circuits and all other tubes are returned to the zero or starting condition and the counter is ready for another cycle of operation.

Referring to Figs. 3 and 3*a*, it is seen that initially the triggers A, B, C, and D are "off," the tube 10 conductive, and the tubes 11 and 12 non-conductive in this embodiment. Accordingly, the triggers and tubes are in the same zero or starting condition as those of Fig. 1. However, in Fig. 3 as compared with Fig. 1, the lead 39 for transferring a negative pulse to the control grid of the tube 10 is connected to the plate of the tube D2 instead of the plate of the tube C2 and the cathodes of the tubes 11 and 12 are connected, respectively, to the control grids of the tubes C2 and B2 instead of to the control grids of the tubes B2 and A2.

The application of the first seven pulses to be counted, to the terminal 30 in Fig. 3, causes normal binary operation as indicated in Fig. 3*a*, at the end of which triggers A, B and C are "on" and trigger D is "off."

The eighth negative pulse applied to the terminal 30 switches the trigger A "off" and the switching of the trigger A causes the trigger B to switch "off." The switching of the trigger B causes the trigger C to switch "off" and the switching of the trigger C causes the trigger D to switch "on." When the trigger D switches "on" a negative pulse is transferred from the plate of the tube D2 to the control grid of the conductive tube 10 to render it non-conductive.

This renders the tubes 11 and 12 conductive which causes the voltage at the control grids of the tubes B1 and C1 to increase and the triggers B and C to switch "on." Then, when the effect of the negative pulse on the control grid of the tube 10 has ended, the tube 10 becomes conductive and the tubes 11 and 12 become non-conductive.

The ninth pulse applied to the terminal 30 switches the trigger A "on."

The tenth pulse applied to the terminal 30 switches the trigger A "off" and the switching of the trigger A causes the trigger B to switch "off." The switching of the trigger B causes the trigger C to switch "off" and the switching of the trigger C causes the trigger D to switch "off" thereby placing the counter in the zero or starting condition and providing a negative pulse at the output terminal 37.

It should be noted that this counter converts from binary to decade counting in a single operation by artificially adding six counts into the counter while retaining all of the advantages of the counters of Figs. 1 and 2.

Referring to Fig. 4, the counter of this embodiment comprises the same components as that shown in Fig. 3. However, the control grids of the tubes B1 and C1 are connected through the resistors 22 to the —100 volt line 28 and the control grids of the tubes B2 and C2 are connected through the resistors 27 to the cancel bias line 23. Also, the lead 39 is connected to the plate of the tube D1 and the control grid of the tube 10 so that the tube 10 will be cyclically controlled by the voltage at the plate of the tube D1 instead of the voltage at the plate of the tube D2 as in Fig. 3.

It is seen, therefore, that when the counter of Fig. 4 is in the zero or starting condition, the triggers A and D are "off," the triggers B and C are "on," the tube 10 conductive, and the tubes 11 and 12 non-conductive.

The first nine pulses applied to the input terminal 30 causes the counter to operate in normal binary fashion after which triggers A, B, C and D are all "on."

The tenth pulse applied to the terminal 30 switches the trigger A "off" and the switching of the trigger A causes the trigger B to switch "off" which in turn causes the trigger C to switch "off." The switching of the trigger C causes the trigger D to switch "off" causing a negative pulse to be transferred from the plate of the tube D1 to the control grid of the tube 10 to render it non-conductive. Accordingly, the tubes 11 and 12 are rendered conductive and cause the triggers B and C to switch "on." When the effect of the negative pulse applied to the control grid of the tube 10 has ended it again becomes conductive and renders the tubes 11 and 12 non-conductive to place the counter in the zero or initial starting condition and the counter is ready for another cycle of operation.

In all the novel embodiments the tube 10 is rendered non-conductive in response to the normal voltage change of the trigger to which its control grid is capacitively coupled and thereafter, without any dependence on the voltage relationships of the trigger circuits of the counter, effects a change in the stable condition of the counter. The positive pulse affecting this switching has a magnitude determined by the tubes 10, 11 and 12, the circuit components associated therewith, and the voltage on the lines 16 and 23. Obviously, this pulse magnitude is completely independent of the pulses to be counted and the voltage relationships produced in the counter in response thereto. The actual conversion of the counter to decade operation is accomplished by switching the stable condition of triggers which have already completed their response to a pulse to be counted which is utilized to initiate the conversion operation. This means that there is no probability of the conversion operation interfering with the normal response of the triggers to the pulses to be counted.

In addition the circuit arrangements shown in Figs. 1, 3, and 4, the tube 10 is rendered non-conductive and the triggers switched by the conduction of the tubes 11 and 12 after the counter has performed all of its normal operations in response to a particular pulse to be counted.

This novel arrangement for converting to decade operation is more fully utilized by the counter of Fig. 4 in that the conversion is accomplished after each tenth pulse to be counted is manifested at the output terminal. Hence, the counter operates in normal binary fashion in response to all ten pulses to be counted, thereby eliminating any possibility of interference with counter operation from the attempted conversion to decade operation.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An electronic counter of the decade type including four trigger circuits each having two conditions of stability alternately assumed, said triggers being connected in a series chain; a source of negative pulses to be counted and a connection therefrom to the first of said triggers; an output connection from the fourth of said triggers for transferring a negative pulse therefrom in response to each tenth pulse from said source; circuit means for placing the counter in a preselected starting condition; a grid controlled tube normally conductive; a connection from the third trigger to the control grid of said grid controlled tube for rendering the latter tube non-conductive when the trigger switches from one stable condition to the other; a pair of tubes each having its cathode connected to a different one of said triggers other than the third and said tubes having their plates connected to the plate of said grid controlled tube, said tubes being rendered conductive when said grid controlled tube is rendered non-conductive to raise the voltage at the triggers connected to their respective cathodes to switch the stable condition of those triggers.

2. An electronic counter including a plurality of counting elements connected in a series chain for response to a certain number of input pulses to complete a counting cycle of operation, each counting element having two stable conditions alternately assumed and being connected as a necessary counting element to actuate the counter through a cycle of normal operation, each said element, except the last in the chain, when switched to one condition causing a change in the stable condition of the next higher element in the chain and when switched to the other condition causing no effect on the stable condition of the other counting elements; a source of input pulses for energizing said chain; means connected to be actuated by one of said elements, independent of the voltage relationships of said elements, to effect said cycle of operation when said counter responds to less than said certain number of input pulses; said means including an electron tube non-responsive to substantially constant voltages at said one element but responsive to a voltage change thereat caused by the normal switching of said one element to only its stable condition which has no effect on the stable condition of other counting elements, current transferring means coupling said electron tube to at least one other of said counting elements to transfer a voltage to said other element to produce artificial counts in said counter when said electron tube is responsive to said voltage change.

3. In a decade counter having four binary trigger circuits connected in a series chain with each trigger having two grid controlled tubes and two stable conditions alternately assumed; a source of pulses to be counted and means for applying the pulses to the control grids of the tubes of the first trigger to effect a switching of the triggers in regular binary fashion; means for placing the triggers in a preselected starting condition and continuously responsive tube means for adding an artificial count of three to the cycle of counter operation twice during each said cycle, said means being effective on said trigger circuits then unaffected by pulses to be counted and including a tube normally conductive, a coupling between the third trigger and said tube for rendering the latter temporarily non-conductive in response to a switching of the third trigger to one stable condition, two tubes rendered non-conductive and conductive respectively by said tube and normally conductive when it is conductive and non-conductive respectively, a connection from one of said two tubes to the control grid of one tube of the first trigger and a connection from the other to the control grid of one tube of the second trigger, said connection permitting said two tubes when conductive to apply a positive voltage to the first and second triggers to switch the stable condition thereof to add a count of three to the cycle of counter operation.

4. In a decade counter having four binary trigger circuits connected in a series chain with each trigger having two grid controlled tubes and two stable conditions alternately assumed; a source of pulses to be counted and means for applying the pulses to the control grids of the tubes of the first trigger to effect a switching of the triggers in regular binary fashion; means for placing the triggers in a preselected starting condition and continuously responsive tube means for adding an artificial count of six to the cycle of counter operation once during each said cycle, said means being effective on said counter after it has responded normally to a pulse to be counted and including a tube normally conductive, a capacitive connection from the second tube of the fourth trigger to said tube normally conductive for rendering the latter temporarily non-conductive in response to a switching of the fourth trigger to one stable condition, two tubes having their plates connected to the plate of said tube and normally conductive and rendered non-conductive and conductive respectively when the latter tube is conductive and non-conductive respectively, a connection from the cathode of one of said two tubes to the control grid of the second tube of the second trigger and a connection from the cathode of the other to the control grid of the second tube of the third trigger, said connection permitting said two tubes when conductive to apply a positive voltage to the control grids of the second tubes of the second and third triggers to render them non-conductive and thereby switch the stable condition of the second and third triggers to add a count of six to the cycle of counter operation.

5. In a decade counter having four trigger circuits connected in a series chain with each trigger having two grid controlled tubes and two stable conditions alternately assumed; a source of pulses to be counted and means for applying the pulses to the control grids of the tubes of the first trigger to effect a switching of the triggers in regular binary fashion; means for placing the triggers in a preselected starting condition and continuously responsive tube means for adding an artificial count of six to the cycle of counter operation once during each said cycle, said means being effective on said counter after it has responded normally to ten pulses to be counted and including a grid controlled tube normally conductive, a capacitive connection from the first tube of the fourth trigger and said grid controlled tube for rendering the latter temporarily non-conductive in response to a switching of the fourth trigger in response to each tenth pulse to be counted, two tubes having their plates connected to the plate of said grid controlled tube and normally conductive and rendered non-conductive and conductive respectively when the latter tube is conductive and non-conductive respectively, a connection from the cathode of one of said two tubes to the control grid of the second tube of the second trigger and a connection from the cathode of the other to the control grid of the second tube of the third trigger, said connection permitting said two tubes when conductive to apply a positive voltage to the control grids of the second tubes of the second and third triggers to render them non-conductive and thereby switch the stable condition of the triggers to add a count of six to the cycle of counter operation in response to each tenth pulse to be counted.

ARTHUR H. DICKINSON.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,390,608 | Miller et al. | Dec. 11, 1945 |
| 2,405,930 | Goldberg et al. | Aug. 13, 1946 |
| 2,410,156 | Flory | Oct. 29, 1946 |
| 2,418,538 | Yetter | Apr. 8, 1947 |
| 2,516,146 | Prugh | July 25, 1950 |

OTHER REFERENCES

RCA Review, September 1946, vol. VII, No. 3, "Electronic Counters" by Grosdoff, pages 438–447.

Electronics, February 1948, "Predetermined Counter of Process Control" by Blume, pages 88–93.